United States Patent
Tomono et al.

(10) Patent No.: US 9,091,571 B2
(45) Date of Patent: Jul. 28, 2015

(54) INSTRUMENT LIGHTING DEVICE

(75) Inventors: Koichi Tomono, Niigata (JP); Norihiro Ogawa, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 98 days.

(21) Appl. No.: 13/265,116

(22) PCT Filed: Apr. 15, 2010

(86) PCT No.: PCT/JP2010/056733
§ 371 (c)(1),
(2), (4) Date: Oct. 18, 2011

(87) PCT Pub. No.: WO2010/125922
PCT Pub. Date: Nov. 4, 2010

(65) Prior Publication Data
US 2012/0048177 A1    Mar. 1, 2012

(30) Foreign Application Priority Data

Apr. 28, 2009 (JP) .................................. 2009-108616

(51) Int. Cl.
*G01D 13/28* (2006.01)
*G01D 11/28* (2006.01)

(52) U.S. Cl.
CPC ................ *G01D 13/28* (2013.01); *G01D 11/28* (2013.01)

(58) Field of Classification Search
CPC .. G01D 11/28; B60K 2350/203; B60Q 3/044; Y10S 116/36
USPC ........... 116/286, 287, 288, DIG. 36, 284, 310
See application file for complete search history.

(56) References Cited

U.S. PATENT DOCUMENTS

| | | | |
|---|---|---|---|
| 6,302,551 B1 * | 10/2001 | Matumoto | 362/27 |
| 6,595,667 B1 * | 7/2003 | Obata | 362/489 |
| 7,503,666 B2 * | 3/2009 | Tamura | 362/26 |

FOREIGN PATENT DOCUMENTS

| | | |
|---|---|---|
| JP | 2001-174293 A | 6/2001 |
| JP | 2003-130693 A | 5/2003 |
| JP | 2003-344116 A | 12/2003 |
| JP | 2005-345287 A | 12/2005 |
| JP | 2006-113004 A | 4/2006 |

* cited by examiner

*Primary Examiner* — Daniel S Larkin
*Assistant Examiner* — Irving A Campbell
(74) *Attorney, Agent, or Firm* — McDermott Will & Emery LLP

(57) ABSTRACT

An instrument lighting device configured in such a manner that even index marks disposed away from the light sources can achieve sufficient luminance using a reduced number of light sources. An instrument lighting device comprising: a pointer needle (4) mounted to a drive shaft (2) of an instrument body (3); a display panel (6) having index marks (5); a light source (7b) for lighting the index marks (5); a reflecting surface section (9) for applying the light from the light source (7b) to the display panel (6); and a reflecting wall section (10) for guiding the light from the light source (7b) toward the reflecting surface section (9). The reflecting wall section (10) comprises a circular conical first reflecting wall section (10a) for mainly lighting index marks (5) which are present in a first index mark region (N) located close to the light source (7b), and also comprises a second reflecting wall section (10b) consisting of a curved surface or a flat sloped surface for mainly lighting index marks (5) which are present in a second index mark region (F) located farther away from the light source (7b) than the first index mark region (N). The instrument lighting device can illuminate the index marks (5) on the display panel (6) by transmitted light with substantially uniform luminance.

8 Claims, 13 Drawing Sheets

INSTRUMENT LIGHTING DEVICE

RELATED APPLICATIONS

This application is the U.S. National Phase under 35 U.S.C. §371 of International Application No. PCT/JP2010/056733, filed on Apr. 15, 2010, which in turn claims the benefit of Japanese Application No. 2009-108616, filed on Apr. 28, 2009, the disclosures of which Applications are incorporated by reference herein.

TECHNICAL FIELD

The present invention relates to an instrument lighting device configured to irradiate the back surface of a display panel of an indicating instrument having translucency with illumination light from a luminous source and light markings and the like therethrough.

BACKGROUND ART

As an instrument lighting device of this type, there is a known type having a configuration in which an instrument body having a drive shaft projecting therefrom is mounted on a circuit board, an indicating needle is mounted to a distal end of the drive shaft, a display panel having translucent markings such as calibration markings or characters along an orbit of rotation of the indicating needle is arranged behind the indicating needle, and the markings of the display panel or the indicating needle are illuminated by a luminous source arranged behind the display panel. In Patent Document 1 and Patent Document 2, the instrument lighting device as described above is configured to irradiate a reflecting surface with an illumination light beam from a luminous source via a reflecting wall which constitutes part of an instrument case, and light the markings provided on the display panel by light reflected from the reflecting surface which constitutes part of the instrument case without using a light guide member.

Therefore, by providing the reflecting wall or the reflecting surface on the instrument case, a lighting device of an instrument can advantageously be made up of relatively simple constituent means without adding components such as individual light guide members, which is effective for cost reduction.

CITED REFERENCE

Patent Document

Patent Document 1: JP-A-2001-174293
Patent Document 2: JP-A-2006-113004

SUMMARY OF INVENTION

Problems to be Solved by the Invention

However, even though Patent Document 1 or Patent Document 2 described above have an advantage in terms of cost because of unnecessity of the light guide member or the like, the markings provided on the display panel are illuminated by the illumination light beam from the luminous source via the reflecting wall or the reflecting surface which constitute part of the instrument case. Therefore, when light from the luminous source lights through the markings on the display panel, the light from the luminous source is guided to reflect from the reflecting wall formed into a substantially inverted conical shape. Subsequently, portions of markings illuminated therethrough by the light reflected from the reflecting wall via the reflecting surface located near the reflecting wall are illuminated brightly, while portions of markings are illuminated therethrough by the light reflected from the reflecting wall via the reflecting surface arranged far from the reflecting wall may not be provided with a sufficient intensity. Therefore, when the area to be illuminated is large, the number of luminous sources needs to be increased, and hence a number of luminous sources are arranged around the center of the indicating needle as a base point to obtain a predetermined lighting intensity.

In view of such problems described above, it is an object of the present invention to provide an instrument lighting device which is capable of obtaining a sufficient intensity with small number of luminous sources even for markings arranged far from the luminous sources.

Means for Solving the Problems

In order to solve the above-described object, there is provided an instrument lighting device including: a circuit board formed of a hard material, an instrument body arranged on the circuit board and having a drive shaft extending toward the front, an indicating needle mounted on a distal end side of the drive shaft, a display panel arranged between the indicating needle and the circuit board and having markings corresponding at least to the indicating needle, a luminance source arranged on the front side of the circuit board and configured to light at least the markings, an instrument housing arranged between the display panel and the circuit board, a reflecting surface portion provided on the instrument housing and configured to irradiate the display panel with light from the luminous source, a reflecting wall portion provided on the instrument housing and arranged so as to face the luminous source for reflecting and guiding the light from the luminous source toward the reflecting surface portion, wherein the reflecting wall portion includes a conical first reflecting wall portion configured to light mainly the markings of the display panel existing in a first marking area near the luminous source, and a second reflecting wall portion formed into a curved surface or a flat inclined surface and provided continuously from the first reflecting wall portion for lighting mainly the markings existing in a second marking area farther from the first marking area.

In this configuration, by providing the first reflecting wall portion configured to light mainly the markings existing in the first marking area near the luminous source and the second reflecting wall portion configured to light mainly the markings existing in the second marking area existing farther from the first marking area and setting the shapes of the first and second reflecting wall portions respectively, lighting through the markings on the display panel at a substantially uniform lighting intensity is achieved while reducing the number of luminous sources.

In the instrument lighting device according to Claim 1, information display portions arranged so as to surround the drive shaft are provided on the display panel, and the reflecting wall portion is provided so as to position outside of an area of the information display portions.

In this configuration, a center area of the display panel, that is, a portion which is an area where the markings are not provided can be effectively used as the information display portion. In addition, by providing the reflecting wall portion including the first reflecting wall portion and the second reflecting wall portion together with the luminous source at positions outside the area of the information display portion on the display panel which corresponds to the information display area, lighting through the markings on the display panel at a substantially uniform lighting intensity is achieved while reducing the number of luminous sources.

In the instrument lighting device according to Claim 1 or Claim 2, the display panel is provided with the markings arranged into an arcuate shape having a base point at the center of rotation of the indicating needle, the reflecting surface portion has the base point at the center of rotation of the indicating needle of the instrument body and includes a first arcuate reflecting surface portion configured to light through the markings provided in the first marking area, and a second arcuate reflecting surface portion provided continuously from the first arcuate reflecting wall portion and configured to light through the markings provided in the second marking area around the position of the luminous source as a base point.

In this configuration, as regards the markings existing in the first marking area near the luminous source, reflected light, which is light from the luminous source reflected and guided via the first reflecting wall portion, is reflected and guided by the first arcuate reflecting surface portion having a base point at the center of rotation of the indicating needle, whereby the markings provided in the first marking area are illuminated therethrough. As regards the markings provided in the second marking areas existing farther from the luminous source, reflected light, which is light from the luminous source reflected and guided via the second reflecting wall portion, is reflected and guided by the second arcuate reflecting surface portion having abase point at the position of the luminous source, whereby the markings provided in the second marking areas are illuminated therethrough. Accordingly, the markings on the entire display panel can be illuminated therethrough in a substantially uniform lighting intensity.

Advantages of the Invention

In the present invention, there is provided an instrument lighting device including: a circuit board formed of a hard material, an instrument body arranged on the circuit board and having a drive shaft extending toward the front, an indicating needle mounted on a distal end side of the drive shaft, a display panel arranged between the indicating needle and the circuit board and having markings corresponding at least to the indicating needle, a luminance source arranged on the front side of the circuit board and configured to light at least the markings, an instrument housing arranged between the display panel and the circuit board, a reflecting surface portion provided on the instrument housing and configured to irradiate the display panel with light from the luminous source, a reflecting wall portion provided on the instrument housing and arranged so as to face the luminous source for reflecting and guiding the light from the luminous source toward the reflecting surface portion, wherein the reflecting wall portion includes a conical first reflecting wall portion configured to light mainly the markings of the display panel existing in a first marking area near the luminous source, and a second reflecting wall portion formed into a curved surface or a flat inclined surface and provided continuously from the first reflecting wall portion for lighting mainly the markings existing in a second marking area farther from the first marking area. Therefore, by setting the shapes of the first and second reflecting wall portions, lighting through the markings on the display panel at a substantially uniform lighting intensity is achieved while reducing the number of luminous sources.

BEST MODES FOR CARRYING OUT THE INVENTION

Figure 1:
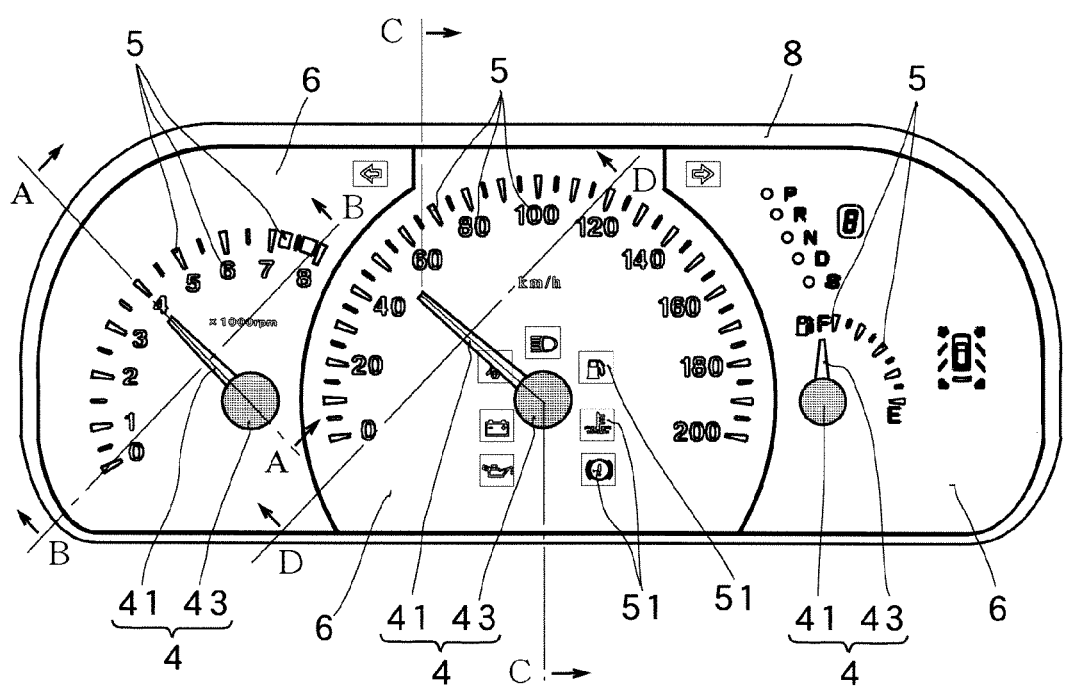
FIG. 1 is a front view showing an instrument lighting device according to an embodiment of the present invention.

FIG. 1 to FIG. 13 show an embodiment of the present invention, and a case where the embodiment of the present invention is applied to an instrument lighting device in an indicating instrument mounted, for example, on an automotive vehicle, will be described with reference to these drawings.

In these drawings, the instrument lighting device in an indicating needle-type indicating instrument according to the embodiment includes a circuit board 1, instrument bodies 3 conductively mounted on the circuit board 1 and each having a drive shaft 2 extending toward the front, indicating needles 4 each mounted on a distal end side of the drive shaft 2, display panels 6 each arranged between the indicating needle 4 and the circuit board 1 and having markings 5 corresponding at least to indication of the indicating needle 4, luminous sources 7 mounted on the front side of the circuit board 1 and configured to illuminate at least through the markings 5, an instrument housing 8 arranged between the display panel 6 and the circuit board 1, reflecting surface portions 9 provided in the instrument housing 8 and each configured to irradiate the display panel 6 with light from the luminous source 7, and reflecting wall portions 10 each provided on the instrument housing 8, arranged so as to face the each luminous source 7 and configured to reflect and guide the light from the luminous source 7 toward the reflecting surface portion 9.

The circuit board 1 is made up of a hard circuit board provided with a wiring pattern (not shown), for example, on a glass epoxy based base material, and includes drive means (not shown) configured to drive and control the instrument body 3 and various circuit components (not shown), for example, such as resistances or capacitors connected in conduction with the wiring pattern.

The instrument bodies 3 are each made up of a movable magnetic instrument or a stepping motor and, in this example, the drive shaft 2 is mounted on the back side of the circuit board 1 so as to penetrate through an axial hole formed on the circuit board 1, and is electrically connected to the wiring pattern (the drive means) by appropriate conduction means such as soldering or the like.

Figure 2:
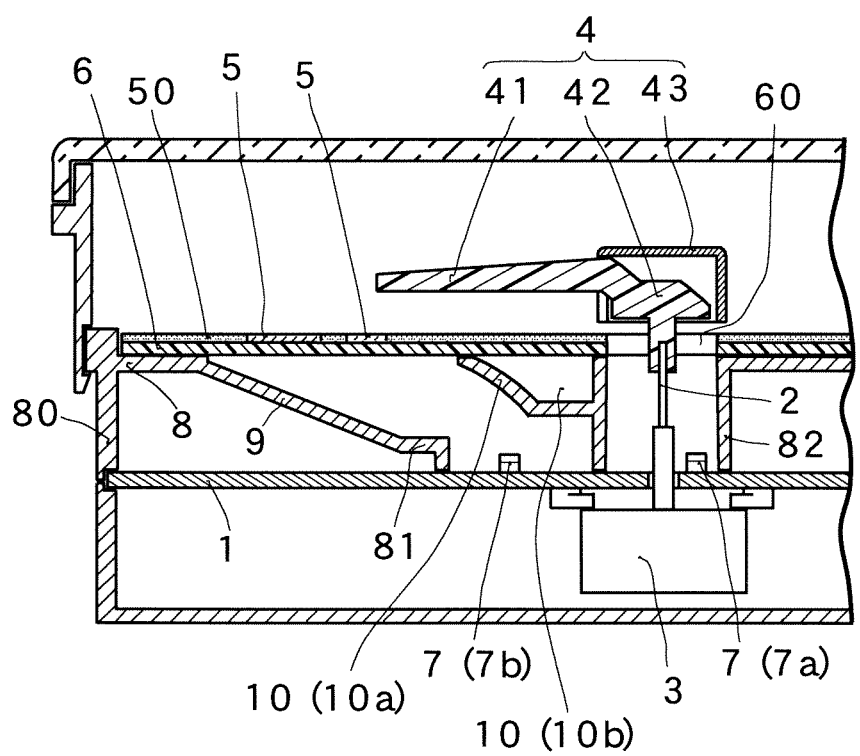
FIG. 2 is an enlarged cross-sectional view principally showing a portion of an engine tachometer taken along the line A-A in FIG. 1.
Figure 7:
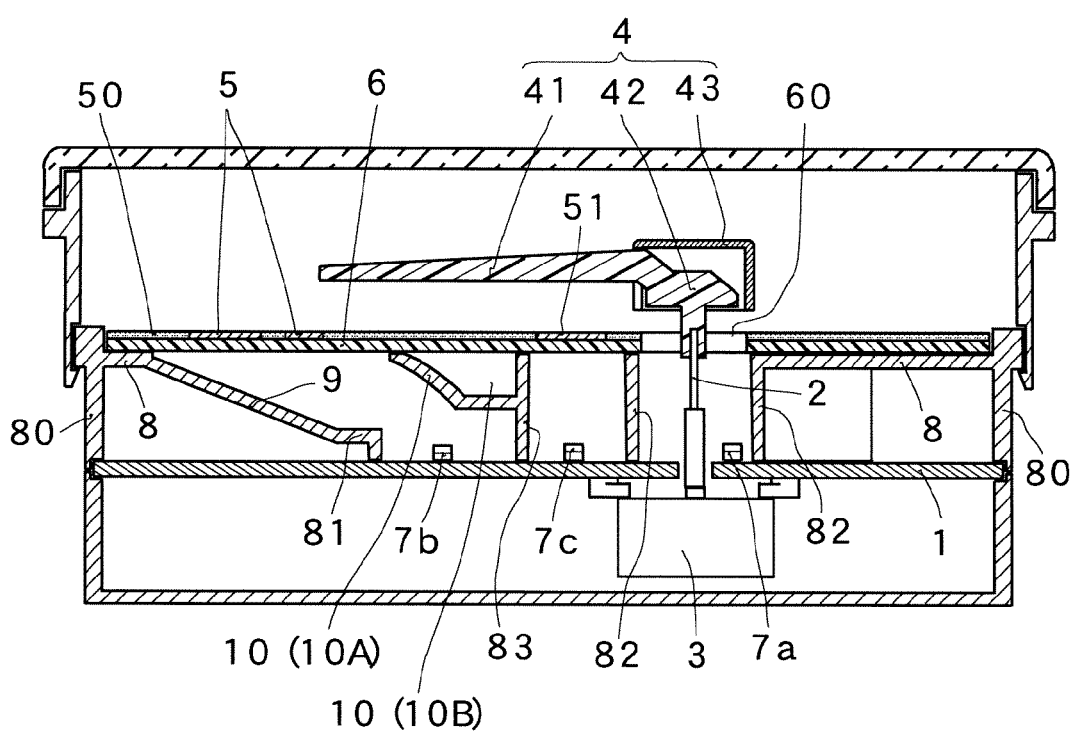
FIG. 7 is a cross-sectional view of the instrument lighting device showing a portion taken along the line C-C of the speedometer in FIG. 1.

The indicating needles 4 are formed of light-transmitting synthetic resin, and each includes an indicating portion 41 configured to indicate the markings 5 such as calibration markings, numeric characters, characters provided on the display panel 6, a proximal portion 42 formed of the same light-transmitting synthetic resin and arranged between the indicating portion 41 and the drive shaft 2, and an indicating needle cap 43 formed of light-shielding synthetic resin covering the proximal portion 42 and a required portion of the indicating portion 41 on the center of rotation thereof, and are each coupled to a distal end of the drive shaft 2 through the proximal portion 42 as shown in FIG. 2, FIG. 7, and so on.

The display panels 6 are formed of a substrate of light-transmitting synthetic resin material, and each includes on the surface of the substrate the light-transmitting markings 5 such as calibration markings, characters, numeric characters which are to be indicated by the indicating needles 4 and are arranged in an arcuate shape along orbits of rotation of the respective indicating needles 4, and a base color portion 50 as a background of the markings 5 is formed together with the markings 5 by means of printing or the like.

As shown in FIG. 1, in the case of the indicating instrument which constitutes an engine tachometer arranged on the left side, the markings 5 provided on the display panel includes calibration marking portions of the engine tachometer and the like and character portions corresponding to the calibration marking portions, such as "numeric characters" and characters such as "×1000 rpm". For the reference sake, the display panel 6 is provided with a through hole 60 at a position corresponding to the drive shaft 2, so that the drive shaft 2 and the indicating needle 4 can be coupled through the through hole 60.

The luminous source 7 is made up of, for example, a chip type light-emitting diode, and an indicating needle lighting luminous sources 7a for lighting the indicating needle 4 and a display unit lighting luminous source 7b for lighting through the markings 5 of the display panel 6 are mounted on the surface of the circuit board 1.

The instrument housing 8 is formed of white color synthetic resin and is made up of side wall portions 80 having a substantially frame shape as a whole for supporting the speedometer, the engine tachometer, a liquid level gauge or the like and bottom wall portions 81 provided so as to connect midsections of the side wall portions 80 respectively, cylindrical portions 82 formed integrally from the instrument housing 8 formed into the frame shape so as to surround the drive shafts 2 of the respective indicating instruments, and one each of the luminous sources 7a for lighting the indicating needle is provided on the front side of the circuit board 1 positioned on a bottom of each of the cylindrical portions 82.

Also, in the embodiment relating to the indicating instrument for the engine tachometer, the reflecting wall portion 10 is formed so as to protrude integrally and continuously from a midsection of an outer peripheral surface of the cylindrical portion 82, and one lighting luminous source 7b for lighting through the markings 5 including the calibration markings or numeric characters for the engine tachometer is arranged at a position right below the reflecting wall portion 10. In this case, the reflecting wall portion 10 is formed so as to protrude in the radial direction from the center of rotation of the indicating needle 4.

Also, the instrument housing 8 also includes the reflecting surface portion 9 configured to reflect and guide light from the luminous source 7b via the reflecting wall portion 10 and reflect and guide the reflected and guided light further toward the markings 5 of the display panel 6 formed continuously from and integrally with the bottom wall portion 81 of the instrument housing 8. In this case as shown in FIG. 6, the reflecting wall portion 10 includes a conical first reflecting wall portion 10a configured to light mainly a first marking area N of the display panel 6 existing in an area near the luminous source 7b, that is, "an area of numeric characters from 2 to 6" and an "area of calibration markings" indicating these numeric characters, and a second reflecting wall portion 10b formed of a curved surface or a flat inclined surface and provided continuously from the first reflecting wall portion 10a and configured to light mainly "areas of numeric characters from 0 to 2 and from 6 to 8" and an "area of calibration markings" indicating these numeric characters, which is second marking areas F existing at a position farther therefrom than the first marking area N.

Also, when the reflecting wall portion 10 in the embodiment is described in detail, the reflecting wall portion 10 is formed of the first reflecting wall portion 10a and the second reflecting wall portion 10b, and the first reflecting wall portion 10a is positioned right above the luminous source 7b and is formed of a semi-circular inverted conical-shaped inclined surface. Accordingly, a light beam irradiated from the luminous source 7b is adapted to be reflected and guided radially in the semi-circular shape from the luminous source 7b as a base point via the semi-circular inverted conical-shaped inclined surface, and light through the portion of the markings 5 of the display panel 6 via the reflecting surface portion 9 provided in the above-described first marking area N.

Figure 3:
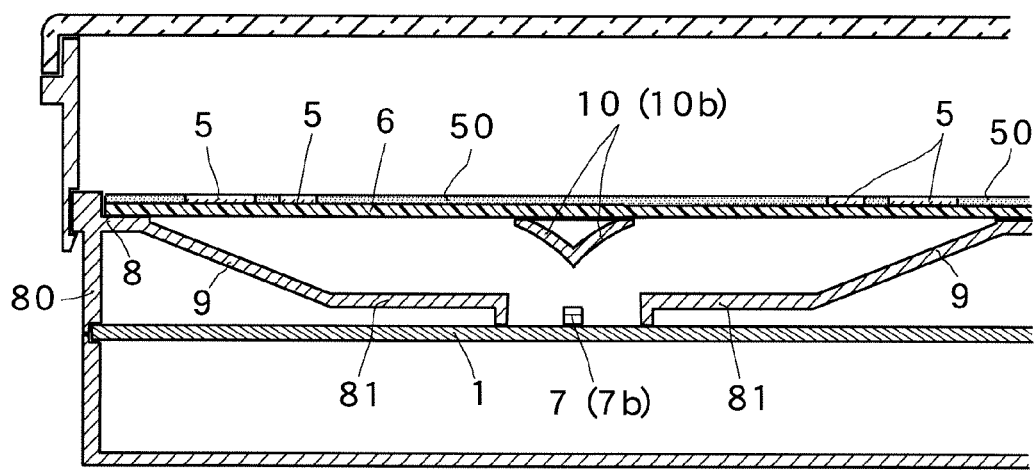
FIG. 3 is an enlarged cross-sectional view principally showing a portion of the engine tachometer taken along the line B-B in FIG. 1.
Figure 4:
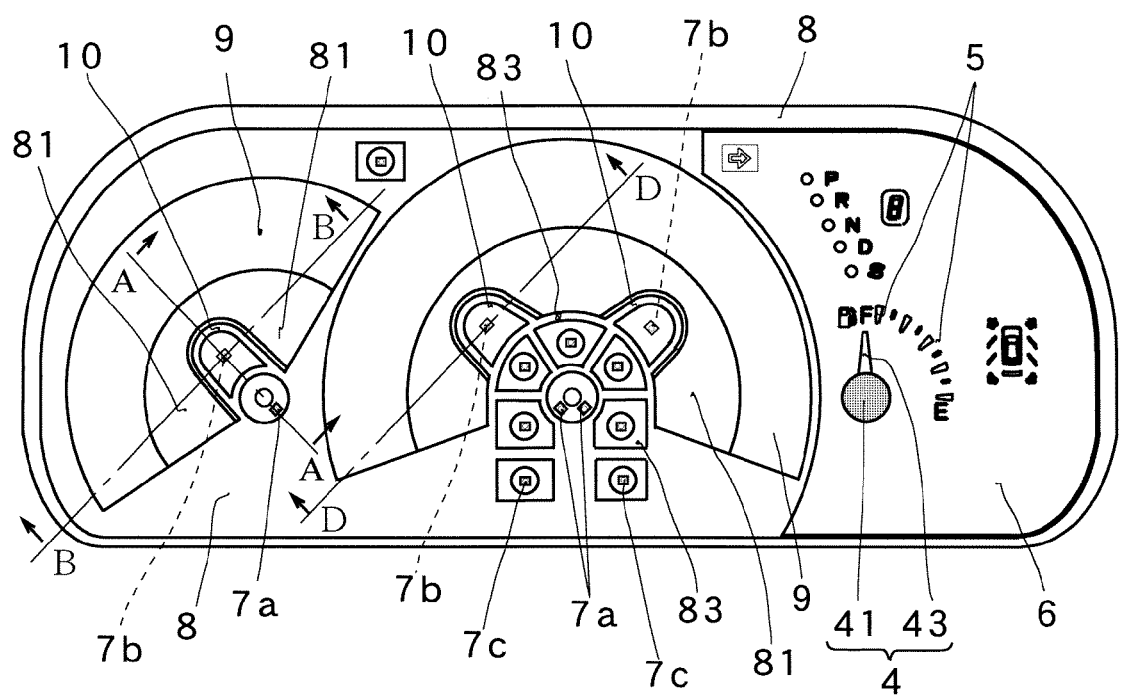
FIG. 4 is a front view of the instrument lighting device showing a state in which a display panel of the engine tachometer and a display panel of a speedometer in FIG. 1 are removed.
Figure 5:
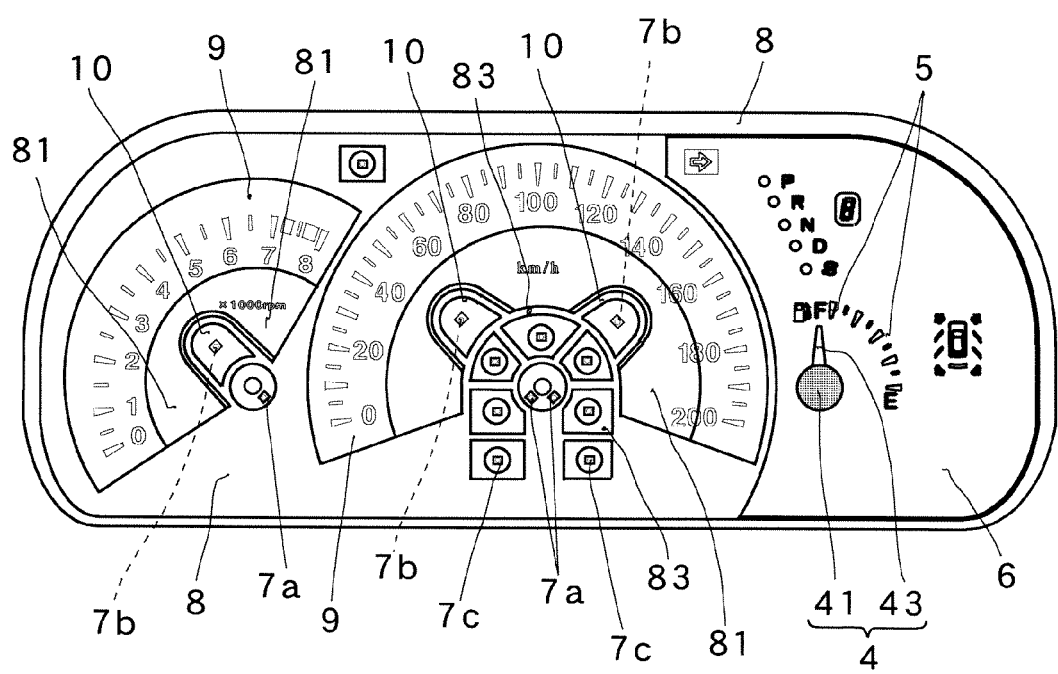
FIG. 5 is a front view showing a state in which an imaginary display portion are overlapped with the position of an instrument housing in FIG. 4.
Figure 6:
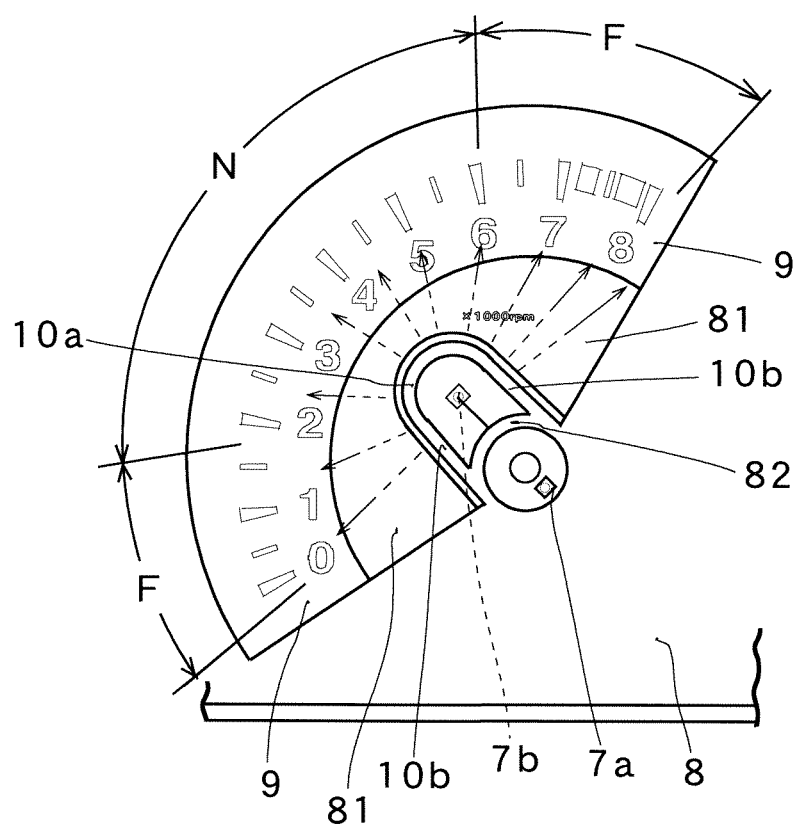
FIG. 6 is a front view roughly showing a reflecting wall surface portion and a reflecting surface portion provided on the instrument housing of the engine tachometer in FIG. 5.

Also, the wall-shaped second reflecting wall portion 10b formed of an inclined surface having a curved shape or a flat surface shape continuing from end portions of the semi-circular shape of the first reflecting wall portion 10a is provided in substantially V-shape in cross section as shown in FIG. 3, and the end portions of the V-shaped wall-shaped reflecting surface are provided so as to continue to the cylindrical portion 82 as shown in FIG. 2 and FIG. 6. In other words, the first reflecting wall portion 10a is arranged on the side of the distal end of the reflecting wall portion 10, and the second reflecting wall portion 10b is arranged on the side of the center of the indicating needle 4, so that a ridge portion of the V-shape of the second reflecting wall portion 10b matches an apex of the conical shape of the first reflecting wall portion 10a. Accordingly, the light beam irradiated from the luminous source 7b is adapted to be guided to the distant marking areas F via the second reflecting wall portion 10b formed of the V-shaped wall-shaped reflecting surface respectively, and light through the portion of the markings 5 of the display panel 6 via the reflecting surface portion 9 provided in the above-described second marking areas F positioned on both sides of the first reflecting wall portion 10a.

In the indicating instrument for the engine tachometer configured in this manner, when the indicating needle lighting luminous source 7a for lighting the indicating needle 4 emits light, the illumination light is guided to the proximal portion 42 of the indicating needle 4 through the through hole 60 of the display panel 6 while being guided toward the inner side of the cylindrical portion 82 of the instrument housing 8, and then is guided from the proximal portion 42 to the indicating portion 41, whereby the indicating portion 41 of the indicating needle 4 is illuminated.

Also, when the display unit lighting luminous source 7b emits light simultaneously with the lighting of the indicating needle 4, the illumination light is reflected by the reflecting wall portion 10 provided right above the luminous source 7b, and the reflected light is guided to the reflecting surface portion 9 and is reflected again, and lights through the markings 5 of the display panel 6, so that the markings 5 of the display panel 6 are displayed brightly with illumination. At this time, in the "area of numeric characters from 2 to 6" and the "area of calibration markings" indicating these numeric characters, which is the first marking area N of the display panel 6 existing in the area near the luminous source 7b, the light beam reflected and guided mainly by the conical first reflecting wall portion 10a lights through the markings 5 of the display panel 6 via the reflecting surface portion 9. Also, it is configured that the light beam is reflected and guided by the second reflecting wall portion 10b formed of the curved surface or the flat inclined surface for mainly lighting the "area of the numeric characters from 0 to 2 and from 6 to 8" and the "area of calibration markings" indicating these numeric characters, which is the second marking areas F existing at a position farther therefrom than the first marking area N, and the reflected and guided light beam is guided to the markings 5 of the display panel 6 via the reflecting surface portion 9, whereby the markings 5 as the second marking areas F are illuminated brightly therethrough while reducing the number of luminous sources 7b. Accordingly, the respective markings 5 existing both on the near and far from the luminous source 7b are uniformly displayed by illumination.

Also, FIG. 7 to FIG. 10 show the speedometer arranged at the center of the instrument device, and in the same manner as the display panel 6 of the engine tachometer described above, it is formed of a substrate of light-transmitting synthetic resin material, and includes on the surface of the substrate the light-transmitting markings 5 such as calibration markings, characters and numeric characters which are to be indicated by the indicating needle 4 and are arranged in an arcuate shape along the orbit of rotation of the indicating needle 4, and the base color portion 50 as a background of the markings 5 is formed together with the markings 5 by means of printing or the like. In the embodiment, a light-transmitting information display portion 51 is formed by means of printing or the like in the same manner as the markings 5 so as to surround the through hole 60 provided at the center of the display panel 6. In this case, the information display portion 51 is formed with characters, designs and symbols for notifying the various states of the vehicle such as the state of engine oil pressure, the state of illumination of lights, a fuel level display, a battery state, or a colored layer for a warning display by printing.

Also, the instrument housing 8 is formed with the cylindrical portion 82 so as to cover the drive shaft 2 of the speedometer, and is formed integrally with light-shielding tubular portions 83 formed so as to be divided into the number of items to be displayed on the information display portion 51 provided on the display panel 6 so as to surround the cylindrical portion 82.

Arranged respectively under the respective tubular portions 83 are information display luminous sources 7c, and these luminous sources 7c are mounted on the circuit board 1 in the same manner as the indicating needle lighting luminous source 7a and the display unit lighting luminous source 7b.

Also, in the indicating instrument for the speedometer, the reflecting wall portions 10 are formed so as to protrude at two positions continuously from an outer peripheral surface of the light-shielding tubular portions 83 provided around the cylindrical portion 82 at a predetermined distance, and two of the lighting luminous sources 7b for lighting through the markings 5 of the tachometer including the calibration markings or numeric characters at positions right below the respective reflecting wall portions 10. In this case, the reflecting wall portion 10 is formed so as to protrude in the radial direction from the center of rotation of the indicating needle 4. Also, the instrument housing 8 also includes the reflecting surface portion 9 configured to reflect and guide light from the two luminous sources 7b via the reflecting wall portion 10 and reflect and guide the reflected and guided light further toward the markings 5 of the display panel 6 formed continuously from and integrally with the bottom wall portion 81 of the instrument housing 8. In this case, the reflecting wall portions 10 includes conical-shaped first reflecting wall portions 10A at two positions for mainly lighting first marking areas N1, N2 of the display panel 6 existing in areas near the luminous sources 7b, that is, two areas N1, N2, namely, the "area N1 of an area of numerical values indicating speeds from 20 km/h to 80 km/h with approximately 50 km/h as a base point" and the "area N2 of an area of numerical values indicating speeds from 120 km/h to 180 km/h with 150 km/h as a base point", and the "two areas of calibration markings" indicating the area of numerical values thereof.

Also, in each of the first reflecting wall portions 10A, a second reflecting wall portion 10B formed of a curved surface or a flat inclined surface which lights mainly "areas of numerical values indicating speeds between 0 km/h and 20 km/h and between 80 km/h and 100 km/h", which is a second marking area F1 existing at a position farther than the first marking area N1 (the area N1 of the numerical value indicating a speed of 20 km/h), and the "areas of calibration markings" indicating these numerical values so as to continue from the first reflecting wall portion 10A provided on the side of low-speed area is formed.

Also, in the first reflecting wall portion 10A provided on the side of the high-speed area as well, the second reflecting wall portion 10B formed of a curved surface or an inclined surface which lights mainly "areas of numerical values indicating speeds between 100 km/h and 120 km/h and between 180 km/h and 200 km/h", which is a second marking area F2 existing at a position farther than the first marking area N2 (the area including the numerical value of 120 km/h), and the "areas of calibration markings" indicating these numerical values so as to continue from the first reflecting wall portion 10A is formed.

At this time, as the shape of the entire reflecting wall portion 10 including the first reflecting wall portion 10A and the second reflecting wall portion 10B arranged right above the luminous source 7b, by setting the first reflecting wall portion 10A to have an appropriate angle or curvature of the conical reflecting wall, or by setting the second reflecting wall portion 10B to have an appropriate angle or curvature of the curved surface, an appropriate angle of inclination of an inclined surface, or an appropriate glossiness of the inclined surface, setting of the amount of light reflected and guided to the markings 5 of the display panel 6 via the reflecting surface portion 9 can be set arbitrarily, so that the same setting is also possible for the markings 5 of the display panel 6 of the engine tachometer describe above.

Also, when the reflecting wall portion 10 in the embodiment is described further in detail, the reflecting wall portion 10 is formed of the first reflecting wall portion 10A and the second reflecting wall portion 10B, and the first reflecting wall portion 10A is positioned right above the luminous source 7b and is formed of a semi-circular inverted conical-shaped inclined surface. Accordingly, a light beam irradiated from the luminous source 7b is adapted to be reflected and guided radially in the semi-circular shape from the luminous source 7b as a base point via the semi-circular inverted conical-shaped inclined surface, and light through the portion of the markings 5 of the display panel 6 in the areas of the respective reflecting surface portions 9 via the respective reflecting surface portions 9 provided in the above-described first marking areas N1, N2 at two positions.

Figure 8:
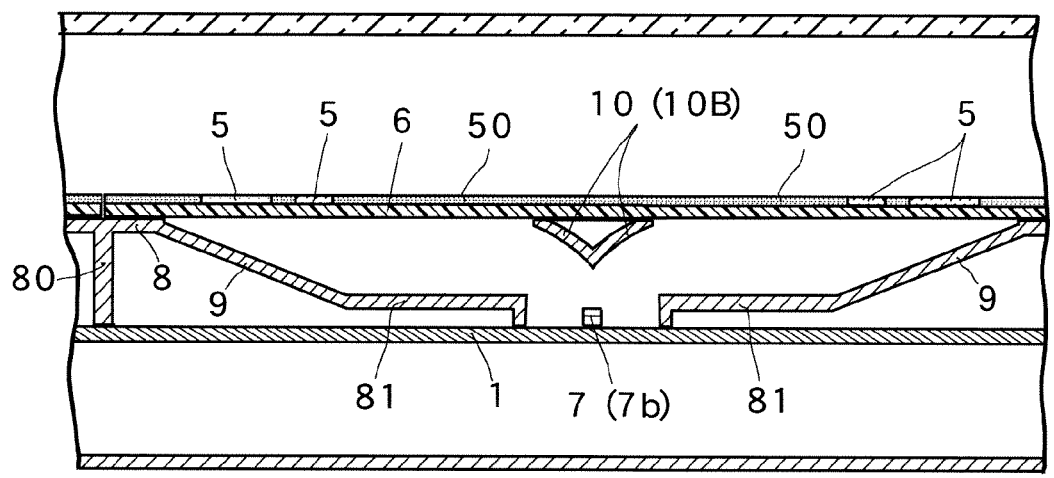
FIG. 8 is a cross-sectional view of the instrument lighting device showing a portion taken along the line D-D of the speedometer in FIG. 1.
Figure 9:
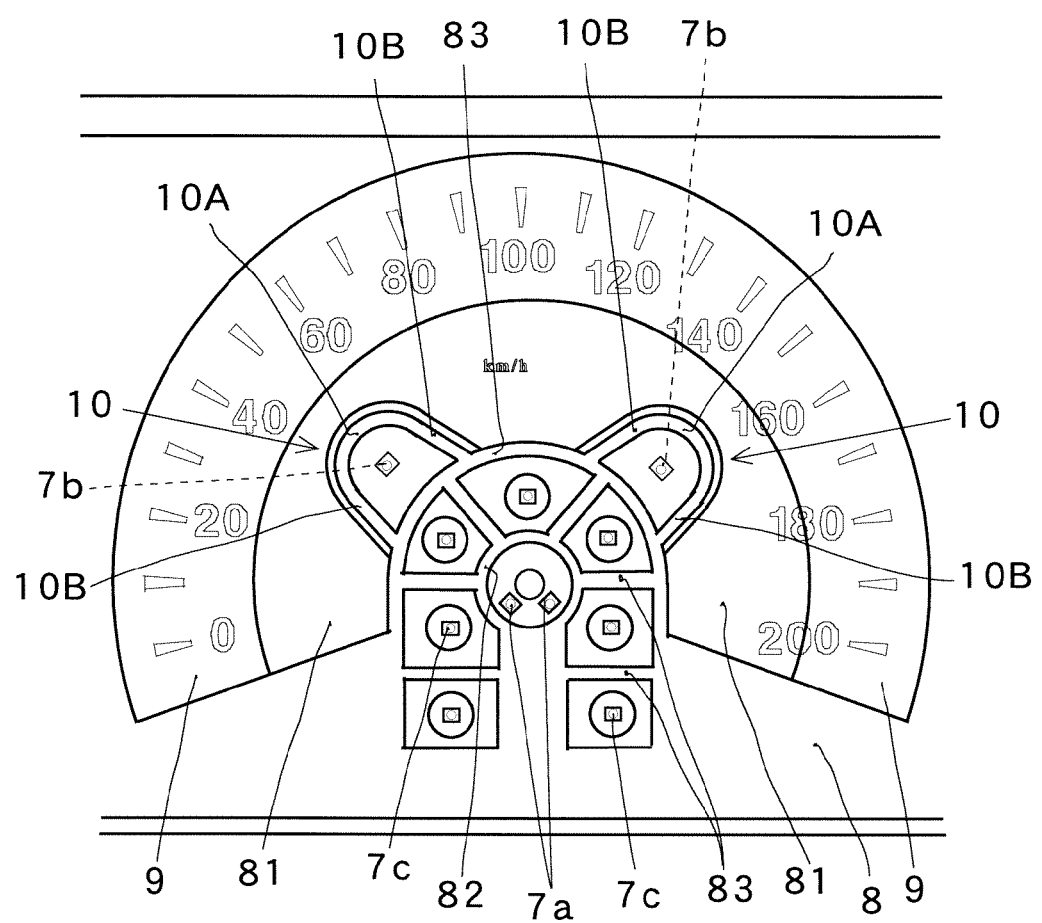
FIG. 9 is a front view roughly showing a tubular portion, the reflecting wall surface and the reflecting surface portion provided on an instrument housing 8 of the speedometer in FIG. 5.
Figure 10:
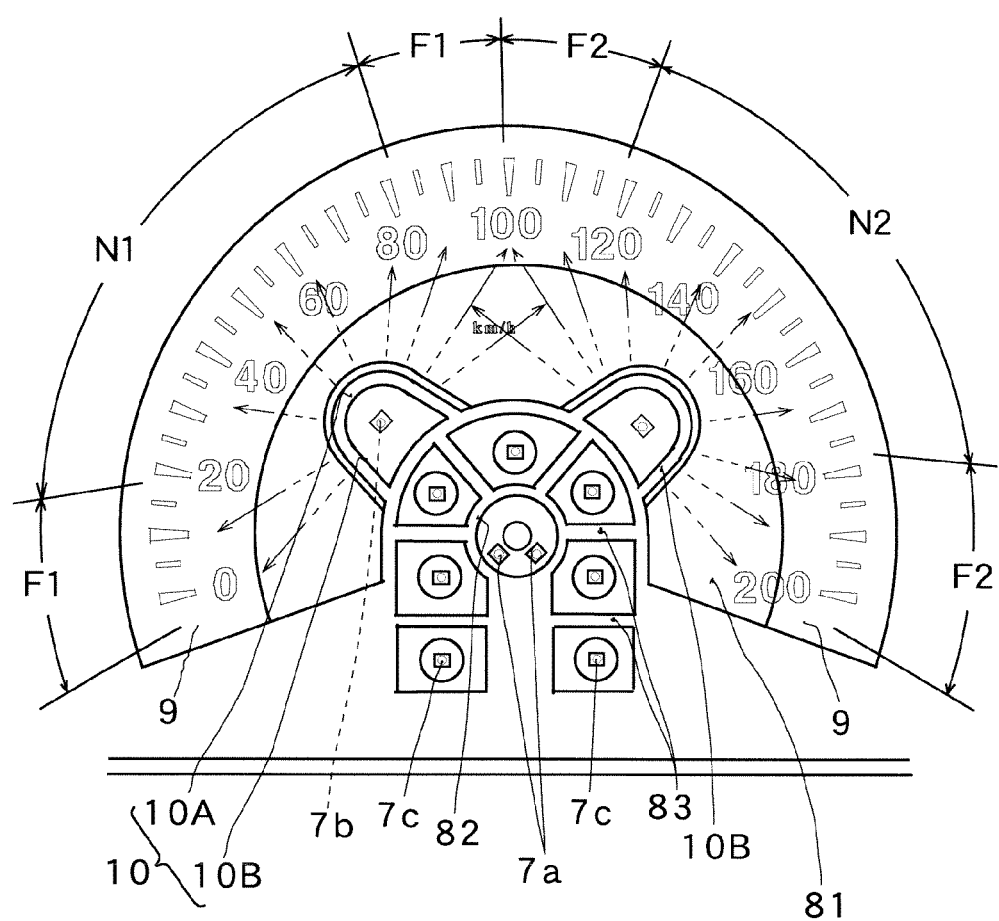
FIG. 10 is a front view roughly showing the reflecting wall portion and the reflecting surface portion shown in FIG. 9.

Also, the wall-shaped second reflecting wall portion 10B formed of an inclined surface having a curved shape or a flat surface shape continuing from end portions of the semi-circular shape of the first reflecting wall portion 10A is provided in a substantially V-shape in cross section as shown in FIG. 8, and the end portions of the V-shaped wall-shaped reflecting surface are provided so as to continue to the outer peripheral portion of the tubular portions 83 shown in FIG. 7 and FIG. 9. In other words, the first reflecting wall portion 10A is arranged on the side of the distal end of the reflecting wall portion 10, and the second reflecting wall portion 10B is arranged on the side of the center of the indicating needle 4, so that a ridge portion of the V-shape of the second reflecting wall portion 10B matches an apex of the conical shape of the first reflecting wall portion 10A. Accordingly, the light beam irradiated from the luminous source 7b is adapted to be guided respectively to the distant marking areas F1, F2 via the second reflecting wall portion 10B formed of the V-shaped two wall-shaped reflecting surfaces, and light through the respective portions of the markings 5 of the display panel 6 via the respective reflecting surface portions 9 provided in the above-described second marking areas F1, F2.

In the indicating instrument for the speedometer configured in this manner, in the same manner as the engine tachometer described above, when the indicating needle lighting luminous source 7a for lighting the indicating needle 4 emits light, the illumination light is guided to the proximal portion 42 of the indicating needle 4 through the through hole 60 of the display panel 6 while being guided toward the inner side of the cylindrical portion 82 of the instrument housing 8, and then is guided from the proximal portion 42 to the indicating portion 41, whereby the indicating portion 41 of the indicating needle 4 is illuminated.

Also, when the two display unit lighting luminous sources 7b emits light simultaneously with the illumination of the indicating needle 4, the illumination light is reflected by the reflecting wall portion 10 provided right above the luminous source 7b, and the reflected light is guided to the reflecting surface portion 9 and is reflected again, and lights through the markings 5 of the display panel 6, so that the markings 5 of the display panel 6 are displayed brightly with illumination. At this time, in "the area of the numerical values indicating speeds from 20 km/h to 80 km/h and the area of the numerical values indicating speeds from 120 km/h to 180 km/h", which are the first marking areas N1, N2 of the display panel 6 existing in the areas near the two luminous sources 7b provided in the low-speed area and the high-speed area and the "areas of calibration markings" indicating these numerical values, the light beam reflected and guided mainly by the conical first reflecting wall portion 10A lights through the markings 5 of the display panel 6 via the reflecting surface portion 9. Also, it is configured that the light beam is reflected and guided by the second reflecting wall portion 10B formed of the curved surface or the flat inclined surface for mainly lighting the "areas of the numerical values indicating speeds between 0 km/h and 20 km/h, between 80 km/h and 100 km/h, between 100 km/h and 120 km/h, and between 180 km/h and 200 km/h" and the "areas of calibration markings" indicating these numerical values, which is the second marking areas F1, F2 located farther than the first marking areas N1, N2, and the reflected and guided light beam is guided to the markings 5 of the display panel 6 via the reflecting surface portion 9, whereby the markings 5 as the second marking areas F1, F2 are illuminated brightly therethrough while reducing the number of luminous sources because what is required is just to install the two luminous sources 7b in the low-speed area and the high-speed area. Accordingly, the respective markings 5 existing both on the near and far from the luminous source 7b are uniformly displayed by illumination.

Also, the display panel 6 is provided with the information display portions 51 on the side of the center of the areas where the markings 5 formed into an arcuate shape are provided, and the tubular portions 83 are also formed respectively corresponding to the information display portions 51. Therefore, for example, when the amount of fuel is reduced below a predetermined amount, the fuel level display portion (the information display portion 51) made up of a design display or the like is illuminated therethrough by the illumination of the luminous source 7c arranged on a bottom of the tubular portion 83, so that adequate determination is enabled.

At this time, by providing the display panel 6 with the information display portions 51 in a free space on the side of the center of the area where the markings 5 are formed into an arcuate shape and the reflecting wall portions 10 at positions outside of the area of the information display portions 51, the portion, which is the area near the center of the display panel 6 can be effectively utilized as the information display portions 51. Also, by providing the reflecting wall portions 10 including the first reflecting wall portion 10A and the second reflecting wall portion 10B together with the luminous sources 7b at positions outside of the area of the information display portions 51 of the display panel 6, which is the information display area, lighting through the markings 5 on the display panel 6 at a substantially uniform lighting intensity is achieved, whereby the area on the front side of the display panel 6 can be utilized effectively.

Figure 11:
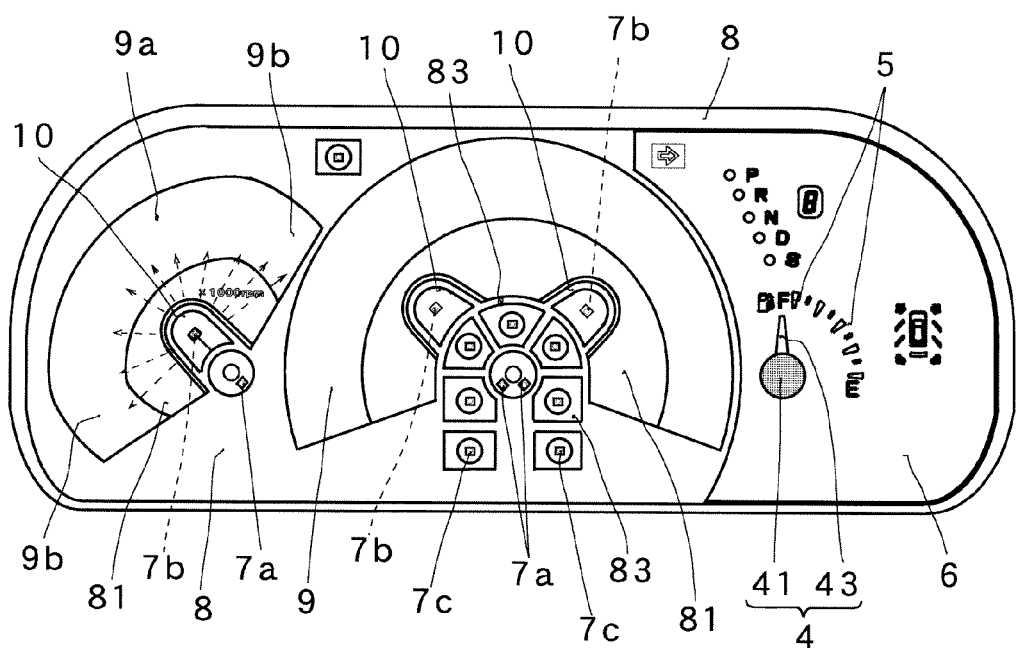
FIG. 11 shows a modification of the embodiment of the present invention, and is a front view of the instrument lighting device in a state in which the display panel of the engine tachometer and the display panel of the speedometer are removed.
Figure 12:
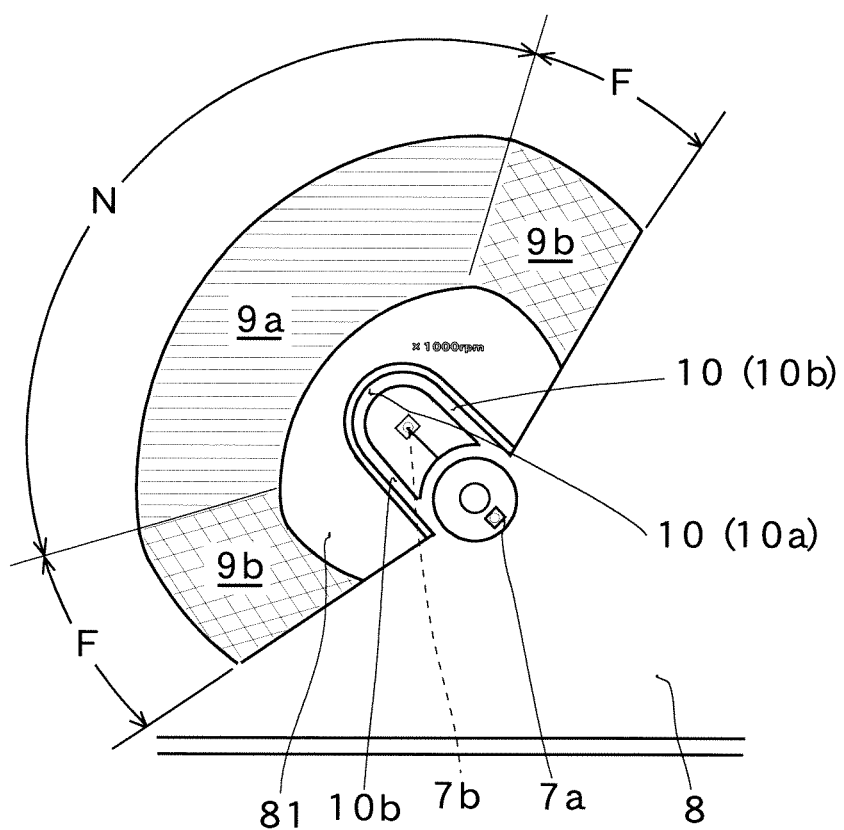
FIG. 12 is a front view roughly showing a modification of the reflecting surface portion provided on the instrument housing of the engine tachometer.
Figure 13:
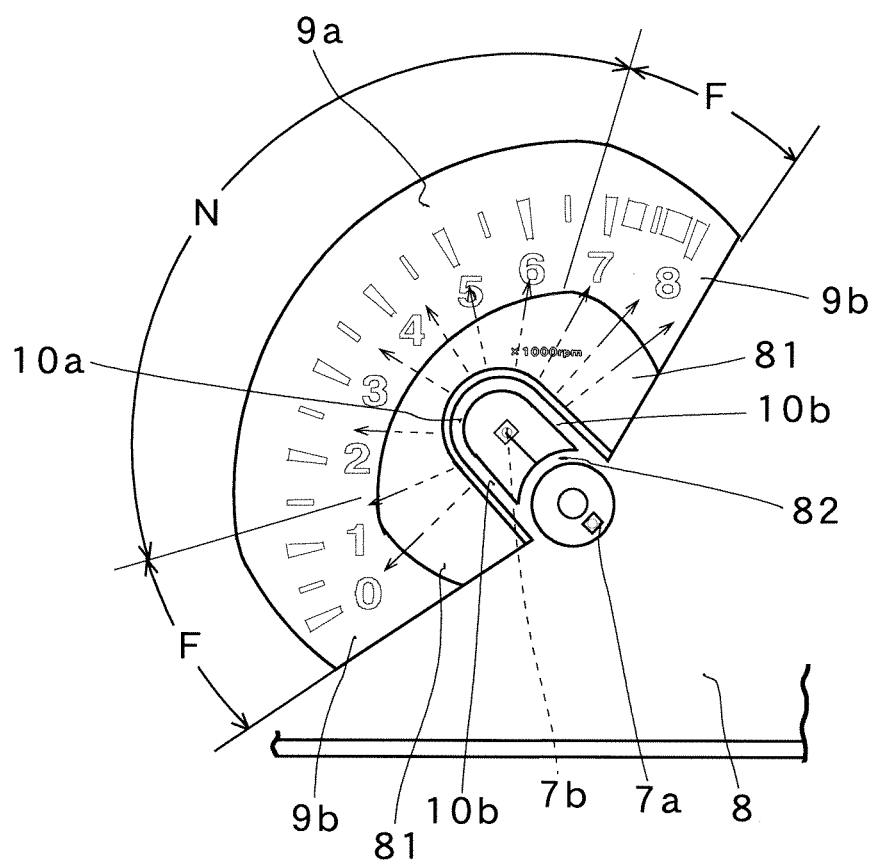
FIG. 13 is a front view roughly showing the reflecting wall portion and the reflecting surface portion in FIG. 12.

Also, FIG. 11 to FIG. 13 show a modification of the embodiment. Here, the indicating instrument for the engine tachometer will be described as an example.

In the same manner as the display panel 6 described above, the front side of the display panel 6 of the engine tachometer includes the light-transmitting markings 5 such as calibration markings, characters and numeric characters which are to be indicated by the indicating needles 4 arranged in an arcuate shape along the orbits of rotation of the respective indicating needles 4, and the base color portion 50 as a background of the markings 5 is formed together with the markings 5 by means of printing or the like.

In substantially the same manner, the instrument housing 8 is formed of white color synthetic resin and is also made up of the side wall portions 80 having a substantially frame shape as a whole for supporting the indicating instruments and the bottom wall portions 81 provided so as to connect midsections of the side wall portions 80 respectively, and the cylindrical portions 82 formed integrally from the instrument housing 8 formed into the frame shape so as to surround the drive shafts 2, and one each of the luminous sources 7a for lighting the indicating needle is provided on the front side of the circuit board 1 positioned on the bottom of each of the cylindrical portions 82.

Also, in the indicating instrument for the engine tachometer, the reflecting wall portion 10 is formed so as to protrude integrally and continuously from the midsection of the outer peripheral surface of the cylindrical portion 82, and one lighting luminous source 7b for lighting through the markings 5 including the calibration markings or numeric characters for the engine tachometer is arranged at the position right below the reflecting wall portion 10. In the same manner as the embodiment described above, the reflecting wall portion 10 includes the conical first reflecting wall portion 10a configured to light mainly the first marking area N of the display panel 6 existing in an area near the luminous source 7b, that is, "an area of numeric characters from 3 to 5" and "an area of calibration markings" indicating these numeric characters, and the second reflecting wall portion 10b formed of a curved surface or a flat inclined surface and provided continuously from the first reflecting wall portion 10a and configured to light mainly "areas of numeric characters from 0 to 2 and from 6 to 8" and "an area of calibration markings" indicating these numeric characters, which is the second marking areas F existing farther therefrom than the first marking area N.

Also, the instrument housing 8 also includes the reflecting surface portion 9 configured to reflect and guide light from the luminous source 7b via the reflecting wall portion 10 including the first reflecting wall portion 10a and the second reflecting wall portion 10b and reflect and guide the reflected and guided light further toward the markings 5 of the display panel 6 formed continuously from and integrally with the bottom wall portion 81 of the instrument housing 8.

In the embodiment according to this modification, a first arcuate reflecting surface portion 9a for lighting through the markings 5 such as the calibration markings or numeric characters provided in the first marking area N about the center of rotation of the indicating needle 4 of the instrument body 3 as a base point and second arcuate reflecting surface portions 9b for lighting through the markings 5 such as the calibration markings or the numeric characters provided in the second marking areas F around the position of the luminous source 7b as a base point are formed as the reflecting surface portion 9, and the second arcuate reflecting surface portions 9b are provided so as to continue from the first arcuate reflecting surface portion 9a.

For reference sake, the reflecting wall portions 10 in this modification includes the first reflecting wall portion 10a and the second reflecting wall portions 10b in the same manner as the display panel 6 for the engine tachometer described above, and the first reflecting wall portion 10a is positioned right above the luminous source 7b, and is formed by an inclined surface of the semi-circular shape in the inverted conical shape. Accordingly, a light beam irradiated from the luminous source 7b is adapted to be reflected and guided radially in the semi-circular shape from the luminous source 7b as a base point via the semi-circular inverted conical-shaped inclined surface, and light through the portion of the markings 5 of the display panel 6 via the reflecting surface portion 9 provided in the above-described first marking area N. Also, the wall-shaped second reflecting wall portion 10b formed of an inclined surface having a curved shape or a flat surface shape continuing from end portions of the semi-circular shape of the first reflecting wall portion 10a is provided in substantially V-shape in cross section, and the end portions of the V-shaped wall-shaped reflecting surface are provided so as to continue to the cylindrical portion 82.

In other words, the first reflecting wall portion 10a is arranged on the side of the distal end of the reflecting wall portion 10, and the second reflecting wall portion 10b is arranged on the side of the center of the indicating needle 4, so that a ridge portion of the V-shape of the second reflecting wall portion 10b matches an apex of the conical shape of the first reflecting wall portion 10a. Accordingly, the light beam irradiated from the luminous source 7b is adapted to be guided to the distant marking areas F via the second reflecting wall portion 10b formed of the V-shaped wall-shaped reflecting surface, and light through the portion of the markings 5 of the display panel 6 via the reflecting surface portion 9 provided in the above-described second marking areas F positioned on both sides of the first reflecting wall portion 10a.

In the indicating instrument for the engine tachometer configured in this manner, as regards the markings 5 existing in the first marking area N near the luminous source 7b, reflected light of light from the luminous source 7b reflected and guided via the first reflecting wall portion 10a is reflected and guided by the first arcuate reflecting surface portion 9a around the center of rotation of the indicating needle 4 as a base point to light through the markings 5 provided in the first marking area N. As regards the markings 5 provided in the second marking areas F existing farther from the luminous source 7b, the light from the luminous source 7b is reflected and guided by the second arcuate reflecting surface portion 9b to light through the markings 5 provided in the second marking areas F. At this time, the second arcuate reflecting surface portions 9b are the reflecting surface portions 9b formed into an arcuate shape about the luminous source 7b as a base point, so that the distance between the luminous source 7b and the reflecting surface portions b does not increase and is set to be constant, lowering of the intensity to be reflected and guided can be prevented in advance, whereby the markings 5 on the entire display panel 6 can be illuminated therethrough in a substantially uniform lighting intensity while reducing the number of the luminous sources 7b.

For reference sake, in the respective embodiments described above, the reflecting wall portions 10 with light from the luminous source 7b arranged right above includes the conical first reflecting wall portion 10a which lights mainly the markings 5 of the display panel 6 existing in the first marking area N near the luminous source 7b and the second reflecting wall portion 10b provided continuously from the first reflecting wall portion 10a and made up of the curved surface or the inclined surface which lights mainly the markings 5 existing in the second marking areas F farther than the first marking area N, so that the lights reflected and guided by the respective reflecting wall portions 10a, 10b are caused to be reflected via the reflecting surface portion 9 and light through the markings 5 of the display panel 6, thereby displaying the relatively wide area uniformly by lighting. Accordingly, the number of the luminous sources 7b can be reduced in comparison with the related art. In this case, as regards the markings 5 existing in the first marking area N near the luminous source 7b, reflected light of light from the luminous source 7b reflected and guided via the first reflecting wall portion 10a is reflected and guided by the reflecting surface portion 9 to light through the markings 5 provided in the first marking area N. As regards the markings 5 provided in the second marking areas F existing farther from the luminous source 7b, reflected light of the light from the luminous source 7b reflected and guided via the second reflecting wall portion 10b is reflected and guided via the reflecting surface portion 9 to light through the markings 5 provided in the second marking areas F, whereby the markings 5 on the entire display panel 6 can be illuminated therethrough in a substantially uniform lighting intensity. Also, when lighting through the markings 5, further uniform lighting effect can be obtained by applying surface treatment such as surface roughing or craping on the surface of the reflecting surface portion 9, for example, in order to reduce uneven lighting.

Also, the luminous source 7b is brought into a state of being stored in a space divided by the display panel 6 in addition to the reflecting wall portions 10, the reflecting surface portion 9 and the bottom wall portion 81, thereby being capable of forming the space as a lighting chamber for guiding the illumination light from the luminous source 7b efficiently to the marking 5 and lighting therethrough. Depending on the case, reduction in thickness of the entire indicating instrument can be realized by the setting of the height dimension of the side wall portion 80 or the dimension between the bottom wall portion 81 and the display panel 6.

INDUSTRIAL APPLICABILITY

Also, as an example of application, the indicating needle type instrument lighting device such as instruments for vehicles or for a motorbike has been described in the embodiment described above. However, the invention is not limited to the indicating instrument for vehicles, and may be applied to the instrument lighting devices for ships or an instrument lighting device for special vehicles such as agricultural machineries or construction equipment.

REFERENCE NUMERALS

1 circuit board
2 drive shaft
3 instrument body
4 indicating needle
5 marking
9 display panel
7 luminous source
7a indicating needle lighting luminous source
7b display unit lighting luminous source
7c information display luminous source
8 instrument housing
9 reflecting surface portion
9a first arcuate reflecting surface portion
9b second arcuate reflecting surface portion
10 reflecting wall portion
10a, 10A first reflecting wall portion
10b, 10B second reflecting wall portion
41 indicating portion
42 proximal portion
43 indicating needle cap
50 base color portion
51 information display portion
60 through hole
80 side wall portion
81 bottom wall portion
82 cylindrical portion
83 tubular portion
N, N1, N2 first marking area
F, F1, F2 second marking area

The invention claimed is:
1. An instrument lighting device comprising:
a circuit board formed of a hard material,
an instrument body arranged on the circuit board and having a drive shaft extending toward the front,
an indicating needle mounted on a distal end side of the drive shaft,
a display panel arranged between the indicating needle and the circuit board and having markings corresponding at least to the indicating needle,
a luminous source for lighting the markings arranged on a front side of the circuit board and configured to light at least the markings,
an instrument housing arranged between the display panel and the circuit board,
a cylindrical portion provided on the instrument housing and formed into a frame shape so as to surround the drive shaft,
a reflecting surface portion provided on the instrument housing and configured to irradiate the display panel with light from the luminous source for lighting the markings arranged on an outer surface of the cylindrical portion,
a reflecting wall portion provided on the instrument housing and arranged so as to face the luminous source for lighting the markings for reflecting and guiding the light from the luminous source for lighting the markings toward the reflecting surface portion, and
information display portions arranged so as to surround the drive shaft are provided on the display panel, wherein:
the instrument housing is formed integrally with light-shielding tubular portions formed so as to be divided into a plurality of items to be displayed on the information display portions provided on the display panel so as to surround the cylindrical portion,
information display luminous sources are arranged respectively under the respective tubular portions and are mounted on the circuit board,
the reflecting wall portion is provided so as to be positioned outside of an area of the information display portions,
the reflecting wall portion includes a conical first reflecting wall portion formed so as to protrude in the radial direction from the center of rotation of the indicating needle and configured to light mainly the markings existing in a first marking area near the luminous source for lighting the markings, and a second reflecting wall portion formed into a curved surface and provided continuously from the first reflecting wall portion for lighting mainly the markings existing in a second marking area farther from the first marking area,
the first reflecting wall portion is arranged on a side of a distal end of the reflecting wall portion, and
the second reflecting wall portion is arranged on a side of the center of the indicating needle outside of the frame shape of the cylindrical portion.
2. The instrument lighting device according to claim 1, wherein the display panel is provided with the markings arranged into an arcuate shape having a base point at the center of rotation of the indicating needle, the reflecting surface portion has a base point at the center of rotation of the indicating needle of the instrument body and includes a first arcuate reflecting surface portion configured to light through the markings provided in the first marking area, and a second arcuate reflecting surface portion provided continuously from the first arcuate reflecting wall portion and configured to light through the markings provided in the second marking area around the position of the luminous source for lighting the markings as a base point.
3. The instrument lighting device according to claim 1, wherein the display panel is provided with the markings arranged into an arcuate shape having a base point at the center of rotation of the indicating needle, the reflecting surface portion has a base point at the center of rotation of the indicating needle of the instrument body and includes a first arcuate reflecting surface portion configured to light through the markings provided in the first marking area, and a second arcuate reflecting surface portion provided continuously from the first arcuate reflecting wall portion and configured to light through the markings provided in the second marking area around the position of the luminous source for lighting the markings as a base point.

4. The instrument lighting device according to claim 1, wherein the first reflecting wall portion is formed so as to protrude integrally and continuously from a midsection of an outer peripheral surface of the cylindrical portion.

5. The instrument lighting device according to claim 1, wherein the second reflecting wall is a semi-circular inverted conical-shaped inclined surface.

6. The instrument lighting device according to claim 1, wherein reflecting wall portions protrude continuously from an outer peripheral surface of a light-shielding tubular portion provided around the cylindrical portion at a predetermined distance.

7. The instrument lighting device according to claim 1, wherein a ridge portion of the second reflecting wall portion matches an apex of the conical shape of the first reflecting wall portion.

8. The instrument lighting device according to claim 1, wherein the second reflecting wall portion at one end connects to one end of the first reflecting wall portion and at another end connects to the frame shape of the cylindrical portion.

\* \* \* \* \*